United States Patent
Spoor et al.

(10) Patent No.: US 12,556,392 B2
(45) Date of Patent: Feb. 17, 2026

(54) INTERACTION ACCOUNT TOKENIZATION SYSTEM AND METHOD

(71) Applicant: Visa International Service Association, San Francisco, CA (US)

(72) Inventors: Laszlo Spoor, Krimpen aan den IJssel (NL); Michael Kemanetzis, Rotterdam (NL); Savio Voskian, Rotterdam (NL)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/902,748

(22) Filed: Sep. 30, 2024

(65) Prior Publication Data

US 2025/0021972 A1    Jan. 16, 2025

Related U.S. Application Data

(62) Division of application No. 17/174,738, filed on Feb. 12, 2021, now Pat. No. 12,141,800.

(51) Int. Cl.
*H04L 9/40* (2022.01)
*G06Q 20/38* (2012.01)
(Continued)

(52) U.S. Cl.
CPC .......... *H04L 9/3213* (2013.01); *H04L 63/102* (2013.01); *G06Q 20/02* (2013.01);
(Continued)

(58) Field of Classification Search
CPC .... G06Q 20/02; G06Q 20/385; G06Q 20/401; H04L 9/3213; H04L 63/083; H04L 63/102; H04L 2209/56
(Continued)

(56) References Cited

U.S. PATENT DOCUMENTS 5,280,527 A    1/1994  Gullman et al.
5,613,012 A    3/1997  Hoffman et al.
(Continued)

FOREIGN PATENT DOCUMENTS

EP    1028401 A2    8/2000
EP    2156397 A1    2/2010
(Continued)

OTHER PUBLICATIONS

Non-Final Office Action, mailed Sep. 25, 2023, U.S. Appl. No. 17/174,738, 22 pages.
(Continued)

*Primary Examiner* — John W Hayes
*Assistant Examiner* — Wodajo Getachew
(74) *Attorney, Agent, or Firm* — Kilpatrick Townsend & Stockton LLP

(57) ABSTRACT

A disclosed method includes a tokenization computer receiving, from a processing network computer, a tokenization request message during an interaction between a first user device and a second user device. The tokenization request message comprises first user account data and second user account data. The tokenization computer can select a tokenization option of a plurality of tokenization options in a tokenization matrix based on the first user account data and the second user account data. The tokenization computer can then determine alternate first user account data and alternate second user account data based on the tokenization option. The tokenization computer can generate a tokenization response message comprising the alternate first user account data and the alternate second user account data. The tokenization computer can then provide the tokenization response message to the processing network computer.

19 Claims, 5 Drawing Sheets

(51) Int. Cl.
*H04L 9/32* (2006.01)
*G06Q 20/02* (2012.01)

(52) U.S. Cl.
CPC ........ *G06Q 20/385* (2013.01); *H04L 63/0807* (2013.01); *H04L 63/083* (2013.01)

(58) Field of Classification Search
USPC ......................................................... 705/75
See application file for complete search history.

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |

(56) References Cited

U.S. PATENT DOCUMENTS

| | | |
|---|---|---|
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,751,642 B2 | 6/2014 | Vargas et al. |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko et al. |
| 9,680,942 B2 | 6/2017 | Dimmick |
| 10,395,223 B2 | 8/2019 | Muthu et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |

(56) References Cited

U.S. PATENT DOCUMENTS

| | | |
|---|---|---|
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1* | 2/2012 | Basu .................. G06Q 20/3674 705/64 |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226802 A1 | 8/2013 | Hammad et al. |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |

(56) References Cited

U.S. PATENT DOCUMENTS

| | | |
|---|---|---|
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0004501 A1 | 1/2017 | Ledford et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi et al. |
| 2017/0148013 A1 | 5/2017 | Rajurkar et al. |
| 2017/0163617 A1 | 6/2017 | Laxminarayanan et al. |
| 2017/0163629 A1 | 6/2017 | Law et al. |
| 2017/0186001 A1 | 6/2017 | Reed et al. |
| 2017/0200156 A1 | 7/2017 | Karpenko et al. |
| 2017/0200165 A1 | 7/2017 | Laxminarayanan et al. |
| 2017/0201520 A1 | 7/2017 | Chandoor et al. |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor et al. |
| 2017/0228728 A1 | 8/2017 | Sullivan |
| 2017/0236113 A1 | 8/2017 | Chitalia et al. |
| 2017/0293914 A1 | 10/2017 | Girish et al. |
| 2017/0295155 A1 | 10/2017 | Wong |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin et al. |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268399 A1 | 9/2018 | Spector et al. |
| 2018/0268405 A1 | 9/2018 | Lopez |
| 2018/0285875 A1 | 10/2018 | Law et al. |
| 2018/0324184 A1 | 11/2018 | Kaja et al. |
| 2018/0324584 A1 | 11/2018 | Lopez |
| 2019/0020478 A1 | 1/2019 | Girish et al. |
| 2019/0066069 A1 | 2/2019 | Faith et al. |
| 2019/0147439 A1 | 5/2019 | Wang et al. |
| 2019/0172060 A1* | 6/2019 | Wettan ............... G06Q 20/3821 |
| 2019/0356489 A1 | 11/2019 | Palanisamy |
| 2019/0384896 A1 | 12/2019 | Jones |
| 2019/0392431 A1 | 12/2019 | Chitalia et al. |
| 2020/0050599 A1* | 2/2020 | Chipman ............ G06Q 20/3672 |
| 2020/0267153 A1 | 8/2020 | Kang et al. |
| 2020/0314644 A1 | 10/2020 | Dean et al. |
| 2021/0167962 A1* | 6/2021 | Wang ................... H04L 9/3213 |
| 2021/0248594 A1* | 8/2021 | Yantis .................. G06Q 20/065 |

(56) References Cited

U.S. PATENT DOCUMENTS

FOREIGN PATENT DOCUMENTS

| | | |
|---|---|---|
| WO | 001 4648 A1 | 3/2000 |
| WO | 0135304 A1 | 5/2001 |
| WO | 0135304 A9 | 5/2002 |
| WO | 2004042536 A2 | 5/2004 |
| WO | 2004051585 A2 | 6/2004 |
| WO | 2005001751 A1 | 1/2005 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Final Office Action, mailed Mar. 14, 2024, U.S. Appl. No. 17/174,738, 16 pages.
Advisory Action, mailed May 30, 2024, U.S. Appl. No. 17/174,738, 6 pages.
Notice of Allowance, mailed Jul. 3, 2024, U.S. Appl. No. 17/174,738, 12 pages.

* cited by examiner

| TOKENIZATION OPTION NUMBER 402 | FIRST USER ACCOUNT DATA 404 | FIRST TOKENIZATION FLAG 406 | SECOND USER ACCOUNT DATA 408 | SECOND TOKENIZATION FLAG 410 | ALTERNATE FIRST USER ACCOUNT DATA 412 | ALTERNATE SECOND USER ACCOUNT DATA 414 |
|---|---|---|---|---|---|---|
| 1 | FIRST REAL ACCOUNT NUMBER | TRUE | SECOND REAL ACCOUNT NUMBER | TRUE | FIRST TOKEN | SECOND TOKEN |
| 2 | FIRST REAL ACCOUNT NUMBER | TRUE | SECOND REAL ACCOUNT NUMBER | FALSE | FIRST TOKEN | SECOND REAL ACCOUNT NUMBER |
| 3 | FIRST REAL ACCOUNT NUMBER | FALSE | SECOND REAL ACCOUNT NUMBER | TRUE | FIRST REAL ACCOUNT NUMBER | SECOND TOKEN |
| 4 | FIRST REAL ACCOUNT NUMBER | FALSE | SECOND REAL ACCOUNT NUMBER | FALSE | FIRST REAL ACCOUNT NUMBER | SECOND REAL ACCOUNT NUMBER |
| 5 | FIRST REAL ACCOUNT NUMBER | TRUE | SECOND TOKEN | N/A | FIRST TOKEN | SECOND TOKEN |
| 6 | FIRST REAL ACCOUNT NUMBER | FALSE | SECOND TOKEN | N/A | FIRST REAL ACCOUNT NUMBER | SECOND TOKEN |
| 7 | FIRST TOKEN | N/A | SECOND REAL ACCOUNT NUMBER | TRUE | FIRST TOKEN | SECOND TOKEN |
| 8 | FIRST TOKEN | N/A | SECOND REAL ACCOUNT NUMBER | FALSE | FIRST TOKEN | SECOND REAL ACCOUNT NUMBER |
| 9 | FIRST TOKEN | N/A | SECOND TOKEN | N/A | FIRST TOKEN | SECOND TOKEN |

*FIG. 4*

INTERACTION ACCOUNT TOKENIZATION SYSTEM AND METHOD

CROSS-REFERENCE TO RELATED APPLICATIONS

This application claims the benefit and priority of U.S. patent application Ser. No. 17/174,738, filed Feb. 12, 2021, entitled "INTERACTION ACCOUNT TOKENIZATION SYSTEM AND METHOD", which is hereby incorporated by reference in its entirety.

BACKGROUND

User to user interactions can occur when one user initiates an interaction with another user to transfer data, share a Wi-Fi connection, transfer an amount, etc. The users may or may not know one another. However, during the interaction, sensitive data such as an account name/number can be provided to the other user in order to complete the interaction. Each user's confidentiality is compromised with current user to user interactions.

Furthermore, these types of user to user interactions can also risk the users' security by providing account names/numbers to the other user. A malicious user can attempt to fraudulently utilize received account names/numbers.

Interactions may also require either the receiver or the sender, or both, to securely store the account names/numbers of other users. Each user needs to have increased security capabilities (e.g., hardware and software) to security store this sensitive data. This presents not only security concerns, but also complexity concerns.

Embodiments of the disclosure address this problem and other problems individually and collectively.

SUMMARY

Embodiments are related to methods and systems for interaction account tokenization processing.

One embodiment is related to a method comprising: receiving, by a tokenization computer from a processing network computer, a tokenization request message during an interaction between a first user device and a second user device, wherein the tokenization request message comprises first user account data and second user account data; selecting, by the tokenization computer, a tokenization option of a plurality of tokenization options in a tokenization matrix based on the first user account data and the second user account data; determining, by the tokenization computer, alternate first user account data and alternate second user account data based on the tokenization option; generating, by the tokenization computer, a tokenization response message comprising the alternate first user account data and the alternate second user account data; and providing, by the tokenization computer, the tokenization response message to the processing network computer.

Another embodiment is related to a tokenization computer comprising: a processor; and a computer-readable medium coupled to the processor, the computer-readable medium comprising code executable by the processor for implementing a method comprising: receiving, by a tokenization computer from a processing network computer, a tokenization request message during an interaction between a first user device and a second user device, wherein the tokenization request message comprises first user account data and second user account data; selecting, by the tokenization computer, a tokenization option of a plurality of tokenization options in a tokenization matrix based on the first user account data and the second user account data; determining, by the tokenization computer, alternate first user account data and alternate second user account data based on the tokenization option; generating, by the tokenization computer, a tokenization response message comprising the alternate first user account data and the alternate second user account data; and providing, by the tokenization computer, the tokenization response message to the processing network computer.

Another embodiment is related to a method comprising: receiving, by an authorizing entity computer, an interaction request message from a first user device comprising an amount, first user account data, and second user account data; determining, by the authorizing entity computer, whether or not to authorize the interaction; if the interaction is authorized, determining, by the authorizing entity computer, a tokenization flag that indicates whether or not to tokenize the first user account data; modifying, by the authorizing entity computer, the interaction request message to include the tokenization flag; and providing, by the authorizing entity computer, the interaction request message to a processing network computer, wherein the processing network computer provides a tokenization request message comprising the first user account data, the second user account data, and the tokenization flag to a tokenization computer, wherein the tokenization computer selects a tokenization option of a plurality of tokenization options in a tokenization matrix based on the first user account data and the second user account data, determines alternate first user account data and alternate second user account data based on the tokenization option, and generates a tokenization response message comprising the alternate first user account data and the alternate second user account data.

Further details regarding embodiments of the disclosure can be found in the Detailed Description and the Figures.

BRIEF DESCRIPTION OF THE DRAWINGS

FIG. 4 shows a tokenization matrix according to embodiments.

DETAILED DESCRIPTION

Figure 1:
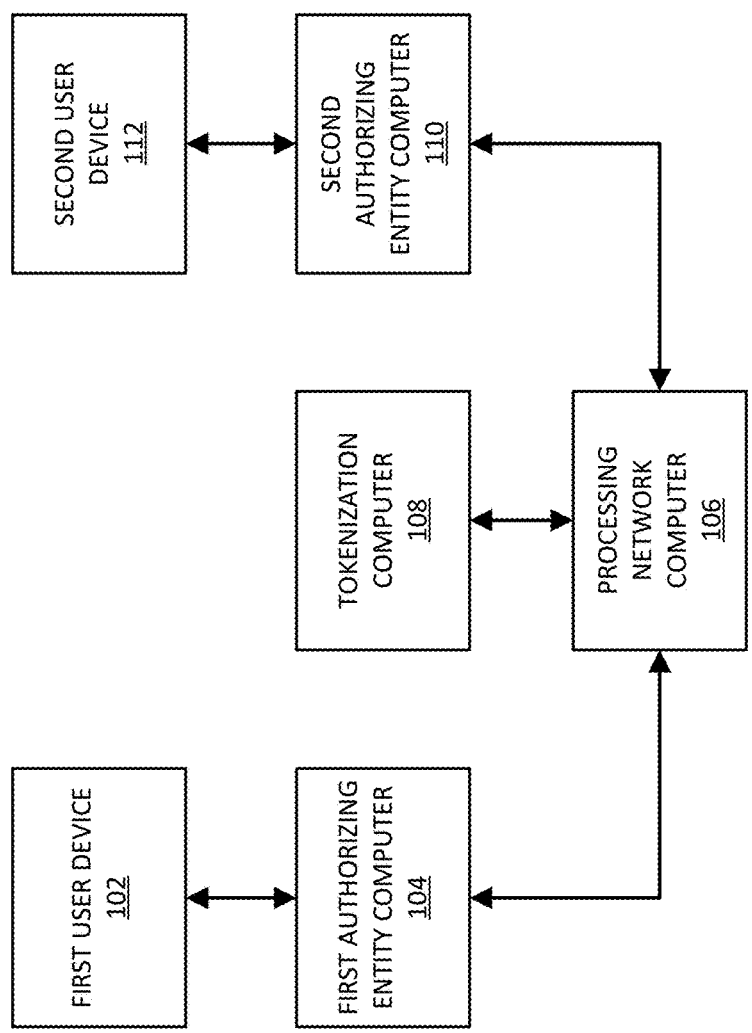
FIG. 1 shows a block diagram of a tokenization system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"User account data" can include one or more pieces of information regarding a record. User account data can include data that identifies and/or is associated with an account maintained for a user. For example, user account data can be a real account number or a token.

"Alternate user account data" can include one or more other pieces of information regarding a record. Alternate user account data can be user account data. In some embodiments, if user account data is a real account number, then the alternate user account data can be a token. As another example, if user account data is a token, then the alternate user account data can be a real account number. However, it is understood that the alternate user account data can be the same data as the user account data based on, for example, a tokenization flag in a tokenization matrix.

A "tokenization flag" can include a variable used to indicate a particular property (tokenization) of data. A tokenization flag can indicate whether or not user account data is to be tokenized during an interaction. In some embodiments, a tokenization flag can be a Boolean value that indicates "True" or "False."

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "tokenization computer" can include a system that services tokens. In some embodiments, a tokenization computer can facilitate requesting, determining (e.g., generating) and/or issuing tokens, as well as maintaining an established mapping of tokens to primary account numbers (PANs) in a repository (e.g. token vault). In some embodiments, the tokenization computer may establish a token assurance level for a given token to indicate the confidence level of the token to PAN binding. The tokenization computer may include or be in communication with a token vault where the generated tokens are stored. The tokenization computer may support token processing of interactions (e.g., payment transactions) submitted using tokens by de-tokenizing the tokens to obtain the actual PANs. In some embodiments, a tokenization other computers such as a processing network computer. Various entities of a tokenization ecosystem may assume the roles of the tokenization computer operator. For example, payment networks and issuers or their agents may become the tokenization computer operator by implementing the token services according to embodiments of the present invention.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "tokenization request message" may be an electronic message for requesting a token. A tokenization request message may include information usable for identifying an account such as a payment account or digital wallet, and/or information for generating a token such as a payment token. For example, a tokenization request message can comprise first user account data (e.g., a first user real account number, a first user token, etc.) and second user account data (e.g., a second user real account number, a second user token, etc.). As an additional example, a tokenization request message may include payment credentials, mobile device identification information (e.g. a phone number or MSISDN), a digital wallet identifier, information identifying a tokenization computer, a cryptogram, and/or any other suitable information. Information included in a tokenization request message can be encrypted (e.g., with an issuer-specific key).

A "tokenization response message" may be a message that responds to a token request. A tokenization response message may include an indication that a token request was approved or denied. For example, a tokenization response message can comprise alternate first user account data (e.g., a first user real account number, a first user token, etc.) and the alternate second user account data (e.g., a second user real account number, a second user token, etc.). A tokenization response message may also include a token, mobile device identification information (e.g. a phone number or MSISDN), a digital wallet identifier, information identifying a tokenization computer, a cryptogram, and/or any other suitable information. Information included in a tokenization response message can be encrypted (e.g., with an issuer-specific key).

A "tokenization matrix" can include an array of tokenization data. A tokenization matrix can include a plurality of rows and columns that include tokenization data. A row in a tokenization matrix can be a tokenization option. A tokenization matrix can be utilized to determine one or more processes to determine altered user account data from user account data. A tokenization matrix can include any suitable number of columns relating to each tokenization option. A tokenization matrix can include columns relating to first user account data, a first tokenization flag, second user account data, a second tokenization flag, alternate first user account data (or a process to obtain alternate first user account data), and alternate second user account data (or a process to obtain alternate first user account data).

"Tokenization options" can include tokenization processes that may be chosen. A tokenization option can be a row in a tokenization matrix. A tokenization option can include one or more tokenization flags. For example, a tokenization option can include a first tokenization flag received from, and set by, a first authorizing entity computer and a second tokenization flag received from, and set by, a second authorizing entity computer. A tokenization computer can determine a particular tokenization option based on received first user account data and second user account data, and in some embodiments, the first tokenization flag and the second tokenization flag. Alternate user account data can be determined using the appropriate tokenization option in the tokenization matrix.

A "processing network computer" may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure allow for user to user interactions utilizing user account data that can include real account numbers and/or tokens. Various embodiments, allow for tokenization, without the need for authorizing entity computers (e.g., various financial institutions) to make any changes to existing interfaces, thus creating a frictionless experience. For this, a tokenization computer can connect to a tokenization computer (e.g., via a processing network computer) and tokenize and/or detokenize originating user (e.g., first user) data and recipient user (e.g., second user) data based on a tokenization matrix. The tokenization computer can store a tokenization matrix comprising a plurality of tokenization options that can allow the tokenization computer to determine which account values to tokenize or tokens to detokenize. Further, the tokenization matrix can include tokenization flags for the originator user and the receiver user that indicate whether or not to perform the tokenization and/or detokenization process to determine alternate user account data. For example, the originator authorizing entity computer (e.g., a first authorizing entity computer) may not be onboarded with the tokenization computer. In such a case, the originator authorizing entity computer can provide first user account data that is a real account number and a tokenization flag that indicates not to tokenize the real account number (since there would be no token available). The tokenization computer may then determine, using a tokenization matrix, alternate first user account data that is the real account number, since no tokenization is to take place for the current interaction.

FIG. 1 shows a tokenization system 100 according to embodiments of the disclosure. The tokenization system 100 comprises a first user device 102, a first authorizing entity computer 104, a processing network computer 106, a tokenization computer 108, a second authorizing entity computer 110, and a second user device 112. The first user device 102 can be in operative communication with the first authorizing entity computer 104, which can be in operative communication with the processing network computer 106. The processing network computer 106 can be in operative communication with the tokenization computer 108 and the second authorizing entity computer 110, which can be in operative communication with the second user device 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in the tokenization system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The first user device 102 and the second user device 112 can include devices operated by a first user and a second user, respectively. The first user device 102, for example, can include a smartphone, a laptop, etc. The first user device 102 can be configured to initiate an interaction with a second user device 112 to obtain a resource, access to a resource, provide a resource, or provide access to a resource. The first user device 102 can connect to the first authorizing entity computer 104 via a webpage or application installed on the first user device 102.

The second user device 112 can be similar to the first user device 102. In some embodiments, the second user device 112 can initiate an interaction with the first user device 102 to obtain a resource, access to a resource, provide a resource, or provide access to a resource. The second user device 112 can connect to the second authorizing entity computer 110 via a webpage or application installed on the second user device 112.

The first authorizing entity computer 104 and the second authorizing entity computer 110 can include computers, server computers, databases, and/or any combination thereof to provide data between a user device (e.g., the first user device 102) and the processing network computer 106. In other embodiments, an authorizing entity computer can be operated by an issuing and/or authorizing entity (e.g., an issuer). An issuer can maintain an account on behalf of a user. For example, the first authorizing entity computer 104 can maintain a first account on behalf of the first user of the first user device 102. For example, the second authorizing entity computer 110 can maintain a second account on behalf of the second user of the second user device 112. The first account, which is associated with the first user, can be identified by first user account data. The first user account data can be a real account number and/or a token. similarly, the second account, which is associated with the second user, can be identified by second user account data. The second user account data can be a real account number and/or a token.

In some embodiments, the first authorizing entity computer 104 and the second authorizing entity computer 110 can be the same authorizing entity computer. For example, the first user of the first user device 102 can be associated with a first account maintained by the first authorizing entity computer 104, while the second user of the second user device 112 can be associated with a second account maintained by the first authorizing entity computer 104.

The processing network computer 106 can include computers, server computers, databases, and/or any combination thereof to coordinate the functions of routing, generating, and formatting messages to facilitate embodiments. In other embodiments, the processing network computer 106 may be in a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The processing network computer 106 can communicate a request message during an interaction between the first user device 102 and the second user device 112. The request message can comprise first user account data and second user account data.

In some embodiments, the processing network computer 106 can generate a tokenization request message, or receive a tokenization request message from an authorizing entity computer (e.g., the first authorizing entity computer 104), and then send the tokenization request message to the tokenization computer 108. The tokenization request message may request a token from the tokenization computer 108, and may include information including first user account data and second user account data. For example, the first user account data can be a PAN for the account to be tokenized. In some embodiments, the tokenization request message can include a first tokenization flag and a second tokenization flag that indicate whether or not to tokenize the related user account data. In other embodiments, the tokenization request message can include information regarding particular environment/circumstances in which the requested alternate user account data (e.g., a token) is to be used (e.g., during a specific time period).

After receiving the tokenization request message from the processing network computer 106, the tokenization computer 108 can select a tokenization option of a plurality of tokenization options in a tokenization matrix based on the first user account data and the second user account data. For example, the tokenization matrix can include multiple tokenization options with varying inputs of first user account data, second user account data, a first tokenization flag, and a second tokenization flag. Utilizing the tokenization option that matches the data received in the tokenization request message can allow the tokenization computer to determine alternate first user account data and alternate second user account data.

The alternate user account data can be other user account data that is associated with a user account. For example, the first user account data can be a real account number while the alternate first user account data can be a token. As another example, the second user account data can be a token while the alternate second user account data can be a real account number. In some embodiments, the alternate user account data can be determined to be the same as the user account data using the selected tokenization option. For example, the first user account data can be a real account number while the alternate first user account data can be the real account number.

The tokenization computer 108 can then generate a tokenization response message comprising the alternate first user account data and the alternate second user account data, then provide the tokenization response message to the processing network computer 106.

If the alternate first user account data and/or the alternate second user account data is a token, then the tokenization computer 108 may obtain the token in any suitable manner. In some embodiments, tokens may be pre-generated by the tokenization computer 108 and stored until a request for a token is received. Once received, the real account number may be stored in a database at the tokenization computer 108 along with the token that will be associated with the real account number. In other embodiments, the token may be generated after receiving the request for the token. The token may or may not be mathematically derived from the real account number and/or any other data associated with the user account and/or the user device. In either case, the user account data (e.g., the token and the real account number), and any cryptogram (as well as any restrictions associated with the cryptogram) may be stored in a database at the tokenization computer 108, or even at the processing network computer 106, in some embodiments. Other information that may reside in the database in the processing network computer 106 may also include balances and/or limitations associated with the token.

Figure 2:
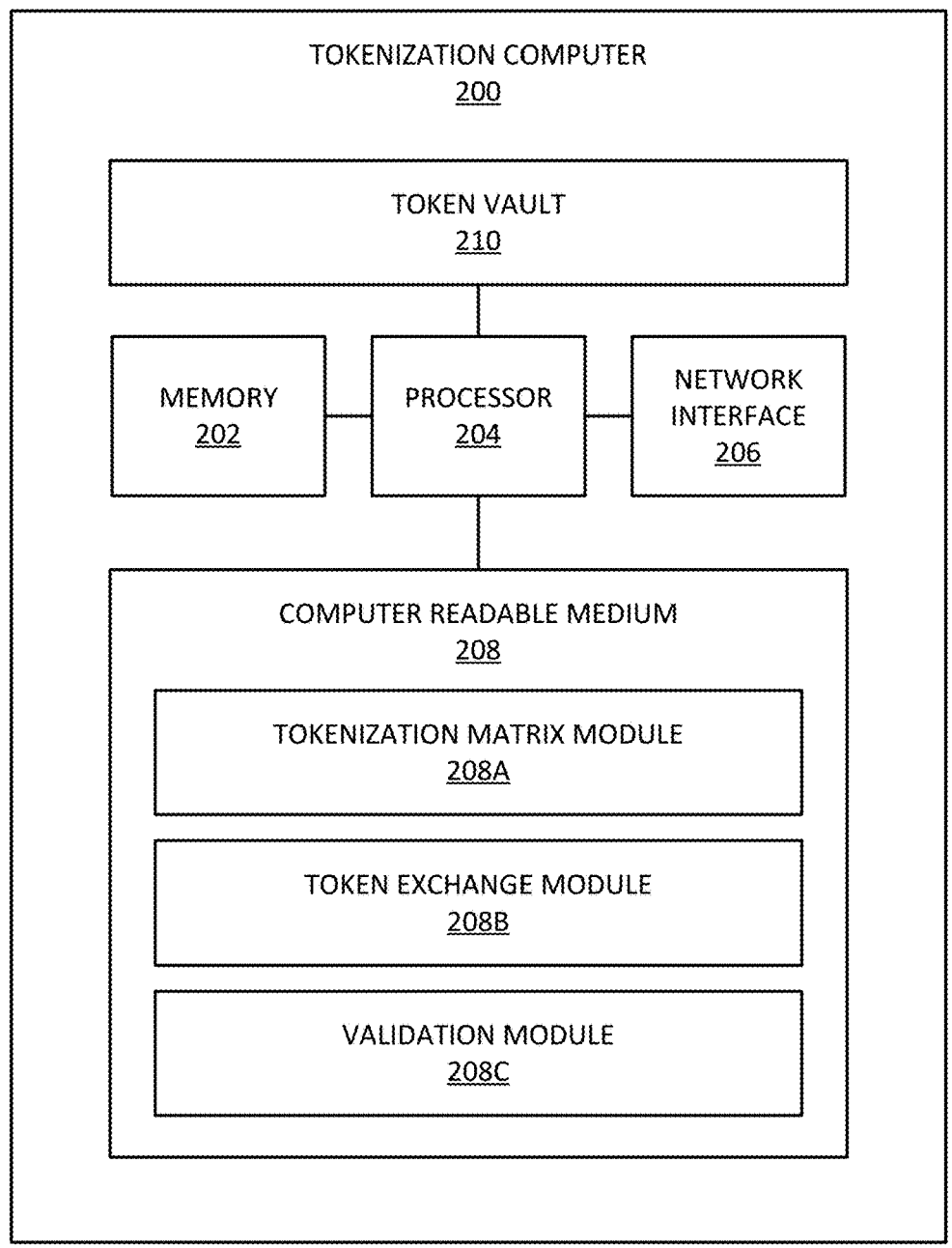
FIG. 2 shows a block diagram of components of a tokenization computer according to embodiments.

FIG. 2 shows a block diagram of a tokenization computer 200 according to embodiments. The exemplary tokenization computer 200 may comprise a processor 204. The processor 204 may be coupled to a memory 202, a network interface 206, a token vault 210, and a computer readable medium 208. The computer readable medium 208 can comprise tokenization matrix module 208A, a token exchange module 208B and a validation module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store first user account data, second user account data, a first tokenization flag, a second tokenization flag, a tokenization matrix, etc.

The token vault 210 may store tokens and their associated credentials (e.g., real account numbers) in a database. The database may also include cryptograms associated with the tokens, as well as any limitations on the use of such tokens or balances associated with the tokens. The token vault 210 may store data in a database such as an Oracle™ database.

The tokenization matrix module 208A may comprise code or software, executable by the processor 204, for creating and utilizing a tokenization matrix. The tokenization matrix module 208A, in conjunction with the processor 204, can generate a tokenization matrix that can indicate what outputs to determine based on input data. The input data can include first user account data, a first tokenization flag, second user account data, and/or a second tokenization flag. The outputs determined by the tokenization matrix module 208A, in conjunction with the processor 204, can include alternate first user account data and alternate second user account data. The tokenization matrix module 208A, in conjunction with the processor 204, can generate any suitable number of tokenization matrices. For example, the tokenization matrix module 208A, in conjunction with the processor 204, can generate a tokenization matrix for each user. In some embodiments, the tokenization matrix module 208A, in conjunction with the processor 204, can generate a tokenization matrix for each pair of users (e.g., for each originator/receiver pair).

Figure 5:
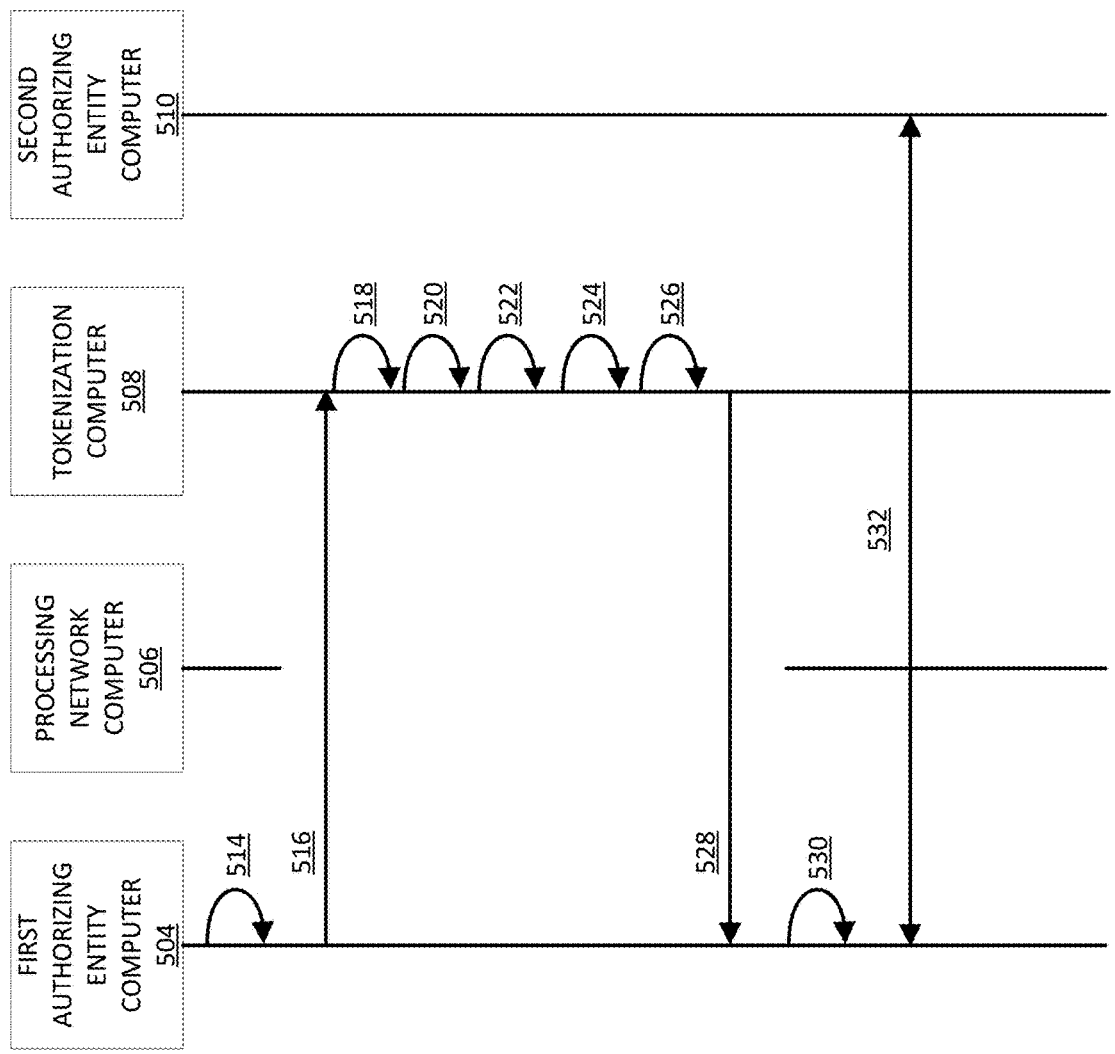
FIG. 5 shows a flow diagram of a token initiation and interaction method according to embodiments.

The tokenization matrix module 208A, in conjunction with the processor 204, can generate a tokenization matrix when a token is provisioned to a user (e.g., as described in further detail in reference to FIG. 5). As an example, the tokenization matrix module 208A, in conjunction with the processor 204 can generate a plurality of tokenization options including each variation of a first tokenization flag and a second tokenization flag as well as each potential input first user account data and second user account data. For example, the tokenization matrix module 208A, in conjunction with the processor 204, can generate a first tokenization option that includes first user account data equal to a real account number, the first tokenization flag set to True, second user account data equal to a real account number, and the second tokenization flag set to False. In such a case, the outputs determined using the first tokenization option may include alternate first user account data equal to a token and alternate second user account data equal to a real account number. The tokenization matrix module 208A, in conjunction with the processor 204, can generate a tokenization matrix as illustrated in FIG. 4.

The tokenization matrix module 208A, in conjunction with the processor 204, can utilize a tokenization matrix upon receiving a tokenization request message comprising first user account data and second user account data. The tokenization request message can further include a first tokenization flag. For example, a first authorizing entity computer associated with the first user device can provide the first tokenization flag for a current interaction. In some embodiments, the tokenization request message can further include a second tokenization flag. For example, the first authorizing entity computer may store second tokenization flags on behalf of a second authorizing entity computer, and may provide the second tokenization flag to the tokenization computer 200 on behalf of the second authorizing entity computer.

In other embodiments, the tokenization matrix module 208A, in conjunction with the processor 204, can receive the first tokenization flag and the second tokenization flag from the first authorizing entity computer and the second authorizing entity computer prior to an interaction. The tokenization matrix module 208A, in conjunction with the processor 204, can utilize these first and/or second tokenization flags when the first and/or second tokenization flags are not received in the tokenization request message.

The token exchange module 208B may comprise code or software, executable by the processor 204, to cause the tokenization computer 200 to provide a token in response to the receipt of a real account number, when a tokenization option of the tokenization matrix indicates the tokenization computer 200 will determine the token associated with the real account number. Furthermore, the token exchange module 208B, in conjunction with the processor 204, can provide a real account number in response to the receipt of a token, when a tokenization option of the tokenization matrix indicate that the tokenization computer 200 will determine the real account number associated with the token. For example, the token exchange module 208B may contain logic that causes the processor 204 to generate a token and/or associate the token with a real account number. A token record may then be stored in a token record database and/or the token vault 210 indicating that the token is associated with a certain user or a certain real account number.

The validation module 208C may comprise code or software, executable by the processor 204, to validate tokenization requests before tokens and/or a real account numbers are provided to external entities. For example, the validation module 208C may contain logic that causes the processor 204 to confirm that a tokenization request message is authentic by decrypting a cryptogram included in the message, by confirming that the credentials in the tokenization request message are authentic and associated with the requesting device, and by assessing a risk associated with the requesting device.

The computer readable medium 208 may comprise code, executable by the processor 204, for performing a method comprising: receiving, by a tokenization computer from a processing network computer, a tokenization request message during an interaction between a first user device and a second user device, wherein the tokenization request message comprises first user account data and second user account data; selecting, by the tokenization computer, a tokenization option of a plurality of tokenization options in a tokenization matrix based on the first user account data and the second user account data; determining, by the tokenization computer, alternate first user account data and alternate second user account data based on the tokenization option; generating, by the tokenization computer, a tokenization response message comprising the alternate first user account data and the alternate second user account data; and providing, by the tokenization computer, the tokenization response message to the processing network computer.

In some embodiments, the tokenization computer 200 can categorize in-network message processing errors into different types. For example, a first type of in-network message processing error can include an error that could occur during tokenization (e.g., unknown account). A second type of in-network message processing error can include an error that could occur during detokenization (e.g., token not found). A third type of in-network message processing error can include restriction check failures (e.g., the interaction amount exceeds a limit, the interaction currency code is invalid, a usage number of the token has been reached, the token is expired, the token counter party check has failed, an invalid token state, etc.).

These message processing errors can be provided to an authorizing entity computer during an interaction. The authorizing entity computer can categorize the token restriction check failures into a hard rejection category or a soft rejection category. A restriction check may have a different rejection level for different interaction type (e.g., credit transfer, request for payment, remittance advice, etc.) messages and for different authorizing entity computer roles (e.g., originator or recipient) in the interaction. During the restriction checks execution, if a restriction failed with a soft reject (e.g., is categorized as a soft rejection), the restrictions check can continue executing the next restriction until all restrictions are executed or a restriction is failed with a hard reject (e.g., is categorized as a hard rejection). Each of the failure reason codes from the soft rejections and the hard rejections can be added to a reason codes field of a response message. In some embodiments, the authorizing entity computer can provide restriction information to the tokenization computer 200 such that the tokenization computer 200 can determine perform the token restriction checks according to preferences set by the authorizing entity computer.

The network interface 206 may include an interface that can allow tokenization computer 200 to communicate with external computers. The network interface 206 may enable the tokenization computer 200 to communicate data to and from another device (e.g., a processing network computer, one or more authorizing entity computers, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
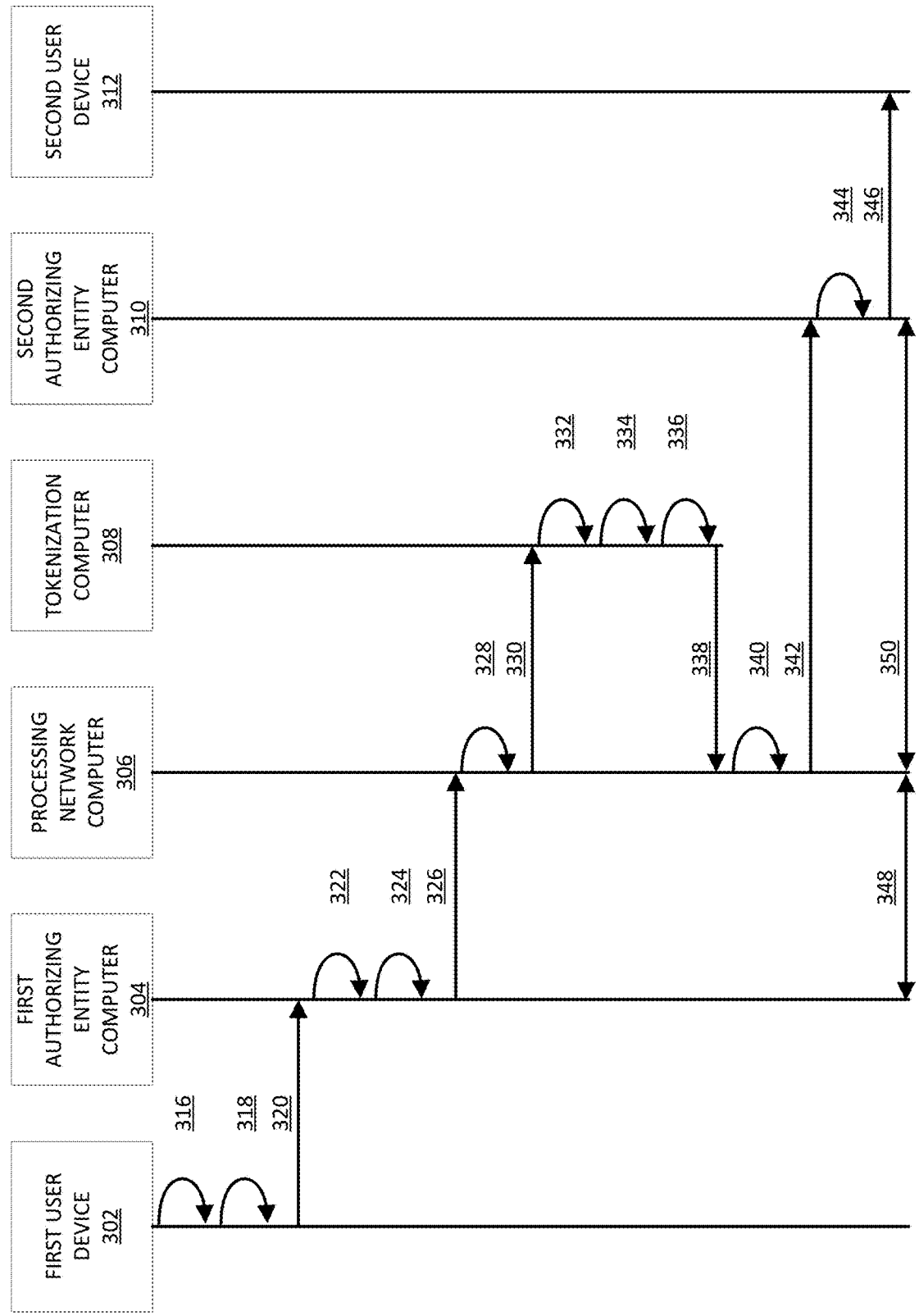
FIG. 3 shows a flow diagram of an account tokenization and interaction method according to embodiments.

FIG. 3 shows a flowchart of an account tokenization and interaction method according to embodiments. The method illustrated in FIG. 3 will be described in the context of a first user initiating an interaction to transfer an amount to a second user. It is understood, however, that the invention can be applied to other circumstances.

At step 316, the first user device 302 can receive user input from the first user to initiate an interaction with a second user of a second user device 312. For example, the first user device 302 can receive an amount that the first user requests to transfer to the second user. The first user can select second user account data or input second user account data associated with the second user of the second user device 312. The second user account data can include a real account number or a token.

In some embodiments, if the first user device 302 has not interacted with the second user device 312 previously, the first user can input a real account number associated with the second user device 312 (e.g., a second real account number). In other embodiments, if the first user device 302 has not interacted with the second user device 312 previously, the first user can input a token associated with the second user device 312 (e.g., a second token). The first user of the first user device 302 can obtain the second real account number or the second token from the second user in any suitable manner (e.g., spoken word, SMS message, secure data transmission, etc.).

If the first user device 302 has interacted with the second user device 312 previously, the first user device 302 can present a list of real account numbers and/or tokens that are associated with users with which the first user can interact. For example, the first user device 302 can present the second real account number or the second token to the first user (e.g., on a display) for selection.

In some embodiments, the first user device 302 can also receive a selection of which first user account data to utilize for the interaction. For example, the first user may be associated with a plurality of first user accounts that are maintained by the first authorizing entity computer 304. The first user can select which account they are requesting to utilize for the interaction. For example, the first user device 302 can present the first user with a list of real account numbers and/or tokens.

At step 318, after receiving user input to perform an interaction, the first user device 302 can generate an interaction request message comprising an amount, the first user account data, and the second user account data. In some embodiments, the first user device 302 can obtain the first user account data from memory.

At step 320, the first user device 302 can transmit the interaction request message to the first authorizing entity computer 304.

In some embodiments, after receiving the interaction request message, the first authorizing entity computer 304 can determine the first user account maintained by the first authorizing entity computer 304 using the first user account data.

At step 322, the first authorizing entity computer 304 can determine whether or not to authorize the interaction. For example, the first authorizing entity computer 304 can verify whether or not the first user account includes an amount greater than or equal to the amount included in the interaction request message. The first authorizing entity computer 304 can generate an indication of whether or not the interaction is authorized. For example, if the interaction is a data transfer, then the first authorizing entity computer 304 can determine whether or not to authorize the data transfer based on content of the data to be transferred, the amount, the data transfer history of the first user device and/or a data limit of the first user device 302.

In some embodiments, the first authorizing entity computer 304 can generate an indication of whether or not the interaction is authorized. For example, if the interaction is authorized, then the first authorizing entity computer 304 can include the indication that indicates that the interaction is authorized in the interaction request message.

In some embodiments, the first authorizing entity computer 304 can determine a first tokenization flag to include in the interaction request message. The first tokenization flag can indicate whether or not the tokenization computer 308 is to tokenize the first user account data. The first authorizing entity computer 304 can determine the first tokenization flag based on the current interaction. For example, if the interaction is the first time that the first user is interacting with the second user, then the first authoring entity computer 304 can determine to set the first tokenization flag to True (to indicate to the tokenization computer 308 to tokenize the first user account data that is the first real account number), thus increasing the security and confidentiality of the interaction.

In other embodiments, the first authorizing entity computer 304 can provide the first tokenization flag to the tokenization computer 308 prior to the current interaction. In such a case, the first tokenization flag can be a default tokenization flag that is to be utilized if the first authorizing entity computer 304 does not provide a tokenization flag in the interaction request message.

At step 326, after authorizing the interaction, the first authorizing entity computer 304 can transmit the interaction request message to the processing network computer 306.

At step 328, after receiving the interaction request message, the processing network computer 306 can generate a tokenization request message comprising the first user data and the second user data. In some embodiments, the tokenization request message can further include a first tokenization flag. In other embodiments, the tokenization request message can further include a second tokenization flag.

At step 330, after generating the tokenization request message, the processing network computer 306 can provide the tokenization request message to the tokenization computer 308.

At step 332, after receiving the tokenization request message from the processing network computer 306, the tokenization computer 308 can select a tokenization option of a plurality of tokenization options in a tokenization matrix based on the first user account data and the second user account data. A tokenization option can include a tokenization process that may be chosen as a row in a tokenization matrix. Each tokenization option of the plurality of tokenization options can be a row in the tokenization matrix that includes one or more tokenization flags. A first tokenization option can include a first tokenization flag received from, and set by, the first authorizing entity computer 304 and a second tokenization flag received from, and set by, the second authorizing entity computer 310.

At step 334, after selecting the tokenization option, the tokenization computer 308 can determine alternate first user account data and alternate second user account data based on the tokenization option. For example, the tokenization option can indicate to the tokenization computer 308 to determine a particular alternate first user account data and a particular alternate second user account data. The tokenization option can indicate that the alternate first user account data should be a first token (associated with the first user), while the alternate second user account data should be a second real account number (associated with the second user). As such, for example, the tokenization computer 308 can tokenize the first real account number to obtain the first token. The tokenization computer 308 can determine not to tokenize the second real account number and that the alternate second account data should be set to the second real account number.

As an illustrative example, FIG. 4 shows a tokenization matrix according to some embodiments. The tokenization matrix shown in FIG. 4 includes a plurality of rows and columns. The tokenization matrix includes the following columns: a tokenization option number 402, first user account data 404, a first tokenization flag 406, second user account data 408, a second tokenization flag 410, alternate first user account data 412, and alternate second user account data 414.

The tokenization option number 402 can be a tokenization option identifier that identifies each row (e.g., tokenization option) of the tokenization matrix.

The first user account data 404, the first tokenization flag 406, the second user account data 408, and the second tokenization flag 410 can be inputs to select a tokenization option. For example, the tokenization computer 308 can receive a tokenization request message comprising first user account data that is a first real account number, a first tokenization flag that is set to true (which indicates to tokenize the first real account number), and second user account data that is a second real account number. The tokenization computer 308 can determine the second tokenization flag that is associated with the second real account number from the database. For example, the second authorizing entity computer 310 may have previously provided the second tokenization flag to the tokenization computer 308. As an example, the second tokenization flag can be equal to True.

The tokenization computer 308 can utilize the aforementioned data to determine which tokenization option to select. In this example, the tokenization computer 308 can determine to select tokenization option number 1.

Referring back to FIG. 4, the alternate first user account data 412 and the alternate second user account data 414 can indicate, to the tokenization computer 308, which outputs to determine. For example, the first tokenization option indicates the alternate first user account data 412 to be a first token and the alternate second user account data 414 to be a second token. The tokenization computer 308, after selecting the tokenization option, can determine the alternate first user account data and the alternate second user account data.

Based on the first tokenization option, the tokenization computer 308 can determine the first token as the alternate first user account data. The tokenization computer 308 can determine and/or generate the first token in any suitable manner. For example, the tokenization computer 308 can retrieve the first token from the token vault or a memory. As another example, the tokenization computer 308 can generate the first token based on predetermined inputs into a cryptographic function. For example, the tokenization computer 308 can generate the first token based any combination of the first real account number, a tokenization computer identifier, a first user device identifier, a first authorizing entity computer identifier, a counter, an identifier, a cryptogram, a date, a time, and/or any other suitable data associated with the first user.

Similarly, based on the first tokenization option, the tokenization computer 308 can determine the second token as the alternate second user account data. The tokenization computer 308 can determine and/or generate the second token in any suitable manner. The tokenization computer 308 can generate the second token in a similar or different manner to the first token.

At step 336, after determining the alternate user account data (e.g., the alternate first user account data and the alternate second user account data), the tokenization computer 308 can generate a tokenization response message comprising the alternate first user account data and the alternate second user account data. In some embodiments, the tokenization response message can further include the amount, the indication of whether or not the interaction is authorized, and/or any other suitable tokenization related data (e.g., no user found messages, tokenization failed flags, etc.).

At step 338, after generating the tokenization response message, the tokenization computer 308 can provide the tokenization response message to the processing network computer 306.

At step 340, after receiving the tokenization response message from the tokenization computer 308, the processing network computer 306 can modify the interaction request message to include the alternate first user account data and the alternate second user account data. For example, the processing network computer 306 can replace the first user account data with the alternate first user account data. The processing network computer 306 can additionally replace the second user account data with the alternate second user account data.

At step 342, after including the alternate user account data in the interaction request message, the processing network computer 306 can transmit the interaction request message to the second authorizing entity computer 310 that maintains the account identified by the alternate second user account data.

At step 344, after receiving the interaction request message, the second authorizing entity computer 310 can update the second user account associated with the second user of the second user device 312. The second authorizing entity computer 310 can update an amount of the second user account with the amount indicated in the interaction request message. For example, the second authorizing entity computer 310 can obtain the second alternate account identifier (e.g., a real account identifier) from the interaction request message, and the determine the second user account using that information prior to updating it.

At step 346, after updating the second user account, the second authorizing entity computer 310 can notify the second user of the update to the second user account. For example, the second authorizing entity computer 310 can transmit any suitable message type to the second user device 312 that includes at least the amount, and in some embodiments, the alternate first user account data.

In some embodiments, the second authorizing entity computer 310 can perform step 346 concurrently with step 344. In other embodiments, the second authorizing entity computer 310 can perform step 346 prior to step 344. For example, the second authorizing entity computer 310 can provide a notification of the interaction to the second user device 312. After the second user device 312 receives the notification, the second user can select to accept or deny the interaction. The second user device 312 can then generate a notification response that indicates whether or not the second user accepted the interaction. Once the second authorizing entity computer 310 receives the notification response, the second authorizing entity computer 310 can update the second user account at step 344 if the second user accepts the interaction.

At steps 348 and 350, a clearing and settlement process may occur. For example, at step 348, the first authorizing entity computer 304 and the processing network computer 306 can transfer funds between the computers (e.g., between accounts maintained by each respective device). For example, the first authorizing entity computer 304 can transfer an amount equal to the amount of the interaction request message, and any fees if applicable, to the processing network computer 306. At step 350, the processing network computer 306 and the second authorizing entity computer 310 can transfer funds between the computers (e.g., between accounts maintained by each respective device). For example, the processing network computer 306 can transfer an amount equal to the amount of the interaction request message to the second authorizing entity computer 310. In some embodiments, the funds provided to the second authorizing entity computer 310, during step 350, can be provided to a second user account that is associated with the second user of the second user device 312.

FIG. 5 shows a flowchart of a token initiation and interaction method according to embodiments. The method illustrated in FIG. 5 will be described in the context of a first user initiating a data transfer interaction to transfer a particular amount of data to a second user. The real account number of the first user may not yet be associated with a token. During the data transfer interaction, the first user's real account number can be associated with a newly generated token. It is understood, however, that the invention can be applied to other circumstances.

Prior to step 514, a first user device (not shown) can initiate a data transfer to transfer an amount of data to a second user device (not shown). The first user's first user account data may not yet be associated with a token. The first user device can transmit a token provisioning request message (e.g., to request a token to be provisioned for particular first user account data) to the first authorizing entity computer 504. The token provisioning request message can include a real account number associated with the first user. This real account number can be the real account number to which the token will be assigned.

At step 514, after receiving the token provisioning request message, the first authorizing entity computer 504 can modify the token provisioning request message to include a tokenization flag. The tokenization flag can indicate whether or not user account data (e.g., the real account number) is to be tokenized during an interaction. For example, the first authorizing entity computer 504 can insert the tokenization flag into the token provisioning request message. In some embodiments, the first authorizing entity computer 504 can provide tokenization flags that indicate to tokenize any real account numbers. In other embodiments, the first authorizing entity computer 504 can provide tokenization flags that indicate not to tokenize a real account number.

As an illustrative example, the token provisioning request message may be a request message for a one-time use token to allow the first user device to perform a data transfer with the second user device one time. In such a case, the first authorizing entity computer 504 can determine that a one-time use token should be utilized with a tokenization flag that indicates to tokenize the real account number. Thus increasing the security of the one-time data transfer, since the real account number will be shielded from the second user device.

At step 516, the first authorizing entity computer 504 can provide the token provisioning request message comprising the real account number and the first tokenization flag to a tokenization computer 508.

At step 518, after receiving the token provisioning request message, the tokenization computer 508 can determine whether or not to generate the token. For example, the tokenization computer 508 can determine whether or not a token has previously been created for the real account number. The tokenization computer 508 can determine not to generate the token if a token has previously been generated for the real account number. In some embodiments, the tokenization computer 508 can determine to generate the token even if a previous token was already generated. For example, in some embodiments, a real account number can be associated with one or more tokens. If the tokenization computer 508 determines not to generate a token, then the tokenization computer 508 can skip step 520. If the tokenization computer 508 determines to generate a token, then the tokenization computer 508 can generate the token at step 520.

At step 520, the tokenization computer 508 can generate the token associated with the real account number. The tokenization computer 508 can generate the token in any suitable manner. For example, the tokenization computer 508 can generate a random number, value, string, etc. to be the token. In other embodiments, the token can be a derived value. For example, the token can be derived based on the real account number, any other user account data, a user identifier, an authorizing entity computer identifier, a tokenization computer identifier, a counter, an index, and/or a cryptographic value.

At step 522, after generating the token, the tokenization computer 508 can store the token in a token vault, as described herein, or in any other secure database. The token can be stored in association with the real account number, such that the tokenization computer 508 can later determine the token based on the real account number or determine the real account number based on the token. In some embodiments, the tokenization computer 508 can store the received tokenization flag as a default tokenization flag to utilize for the user device.

At step 524, in some embodiments, the tokenization computer 508 can generate a tokenization matrix. The tokenization computer 508 can generate the tokenization matrix with any suitable number of new tokenization options. The tokenization computer 508 can generate the tokenization matrix by iterating through each variation of first user account data, second user account data, a first tokenization option and a second tokenization option. For example, the tokenization computer 508 can generate the following two tokenization options, which may be the first two tokenization options in the tokenization matrix (separated into inputs and outputs for ease of illustration):

Tokenization_option_1_inputs
    (first_user_account_data="first real account number",
    first_tokenization_flag=true,
    second_user_account_data="second real account number", second_tokenization_flag=true);
Tokenization_option_1_outputs
    (alternate_first_user_account_data="first token",
    alternate_second_user_account_data="second token");
Tokenization_option_2_inputs
    (first_user_account_data="first real account number",
    first_tokenization_flag=true,
    second_user_account_data="second real account number", second_tokenization_flag=false);
Tokenization_option_2_outputs
    (alternate_first_user_account_data="first token",
    alternate_second_user_account_data="second real account number").

At step 526, after generating the token, the tokenization computer 508 can generate a token provisioning response message comprising the token. In some embodiments, the token provisioning response message can comprise the token and the real account number.

At step 528, after generating the token provisioning response message, the tokenization computer 508 can provide the token provisioning response message to the first authorizing entity computer 504.

At step 530, after receiving the token provisioning response message, the first authorizing entity computer 504 can begin processing the data transfer to transfer data from the first user device to the second user device. In some embodiments, the first authorizing entity computer 504 can provide the token provisioning response message to the first user device. In other embodiments, the first authorizing entity computer 504 can provide the token from the token provisioning response message to the first user device.

In some embodiments, at step 530, the first authorizing entity computer 504 and determine whether or not to authorize the data transfer based on content of the data to be transferred, the amount, the data transfer history of the first user device, a data limit of the first user device, and/or any other information and/or data stored by the first authorizing entity computer 504.

At step 532, the first authorizing entity computer 504, the processing network computer 506, the tokenization computer 508, and the second authorizing entity computer 510 can process the interaction (e.g., the data transfer) as described in FIG. 3. The steps included in step 532 are similar to the steps described in reference to FIG. 3 and will not be repeated here.

Embodiments of the disclosure have a number of advantages. The first user and the second user that perform an interaction may or may not know one another. However, during current interactions, sensitive data such as real account numbers are required to be provided to the other user in order to complete the interaction, thus compromising the confidentiality of each user. Embodiments provide advantages over previous interaction systems by maintaining confidentiality of real account numbers. During processing, the tokenization computer can determine a token for either user, or both users, of the interaction, thus hiding the real account numbers.

Doing so further provides for the advantage of increased security. For example, malicious user can attempt to fraudulently utilize received real account numbers. However, the tokenization computer can determine alternate first user account data that is a token using a tokenization option of a tokenization matrix that includes a tokenization flag that indicates to tokenize the real account number of the first user when interacting with the second user. Thus preventing the second user from receiving the first user's real account number.

Embodiments of the disclosure have a number of additional advantages. For example, a particular user (and/or an authorizing entity computer that maintains the user's account) may not be enrolled in the tokenization service and may not yet have a token associated with a real account number. In such a case, the tokenization flag associated with the user and provided by the authorizing entity computer to the tokenization computer can indicate not to determine a token for the real account number. This is beneficial since the system is agnostic of authorizing entity computer enrollment status and can still allow users to participate in peer-to-peer interactions. Further, enrollment of the users of an institution in a token service can be difficult, since it involves a significant amount of effort, and the users within a particular institution (e.g., a banking institution) to be enrolled may join or leave that institution in an unpredictable manner.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a first authorizing entity computer, an interaction request message from a first user device comprising an amount, first user account data, and second user account data, during an interaction between a first user and a second user;

determining, by the first authorizing entity computer, to authorize the interaction;

determining, by the first authorizing entity computer, a tokenization flag that indicates not to tokenize the first user account data;

modifying, by the first authorizing entity computer, the interaction request message to include the tokenization flag, wherein the tokenization flag is a first tokenization flag; and providing, by the first authorizing entity computer, the interaction request message to a processing network computer;

receiving, by a tokenization computer from the processing network computer, a tokenization request message, wherein the tokenization request message comprises the first user account data, the second user account data and the first tokenization flag, wherein the first user account data is a first real account number associated with the first user of the first user device and the second user account data is a second real account number associated with the second user of a second user device;

selecting, by the tokenization computer, a tokenization option of a plurality of tokenization options in a tokenization matrix based on the first user account data and the second user account data, wherein the tokenization option includes the first user account data, the second user account data, the first tokenization flag, and a second tokenization flag, wherein the first tokenization flag is set by the first authorizing entity computer and the second tokenization flag is a second value set by a second authorizing entity computer that maintains a second user account on behalf of the second user of the second user device;

determining, by the tokenization computer, alternate first user account data and alternate second user account data based on the tokenization option, and generating, by the tokenization computer, a tokenization response message comprising the alternate first user account data and the alternate second user account data; and providing, by the tokenization computer, the tokenization response message to the processing network computer.

2. The method of claim 1, further comprising:

transferring, by the first authorizing entity computer, the amount from an account of the first user to an account of the second user based on determining to authorize the interaction.

3. The method of claim 1, wherein the interaction request message comprises an amount of funds, wherein the processing network computer receives the tokenization response message, modifies the tokenization response message with the alternate first user account data and the alternate second user account data, and provides the tokenization response message to the second authorizing entity computer.

4. The method of claim 3, further comprising:

providing, by the first authorizing entity computer, the amount of funds indicated in the interaction request message to the second authorizing entity computer via the processing network computer using the alternate second user account data.

5. The method of claim 1, wherein the second user account data is selected from a list of account data by the first user on the first user device.

6. The method of claim 5, wherein the interaction between the first user device and the second user device is a data transfer between the first user device and the second user device, wherein the amount is an amount of data to be transferred, wherein determining whether or not to authorize the interaction further comprises:

determining, by the first authorizing entity computer, whether or not to authorize the data transfer based on content of the data to be transferred, the amount, a data transfer history of the first user device and/or a data limit of the first user device.

7. The method of claim 1, wherein the first authorizing entity computer maintains a first user account on behalf of the first user of the first user device.

8. The method of claim 1, wherein the first user account data is a real account number associated with the first user of the first user device, and wherein the tokenization flag indicates not to tokenize the real account number.

9. The method of claim 1, wherein the first user account data is the same as the alternate first user account data.

10. The method of claim 1, further comprising:

providing, by the first authorizing entity computer, a notification of the interaction to the first user device;

receiving, by the first authorizing entity computer from the first user device, a notification response that indicates whether or not the first user accepted the interaction; and updating, by the first authorizing entity computer, a user account if the first user accepts the interaction.

11. The method of claim 1, wherein determining the alternate first user account data comprises determining that the first authorizing entity computer associated with the first user device is not enrolled in a tokenization program with the tokenization computer and determining that the first user account data is not to be tokenized.

12. The method of claim 1, wherein determining the alternate second user account data comprises determining that the second authorizing entity computer associated with the second user device is enrolled in a tokenization program with the tokenization computer and determining that the second user account data is to be tokenized, and wherein the alternate second user account data is a token.

13. The method of claim 1, wherein the second user account data is not exposed to the first user device.

14. A system comprising: a first authorizing entity computer comprising:

an authorizing entity processor; and an authorizing entity computer-readable medium coupled to the authorizing entity processor, the authorizing entity computer-readable medium comprising authorizing entity code executable by the authorizing entity processor for implementing a method comprising:

receiving an interaction request message from a first user device comprising an amount, first user account data, and second user account data, during an interaction between a first user via the first user device and a second user via a second user device;

determining to authorize the interaction;

determining a tokenization flag that indicates not to tokenize the first user account data;

modifying the interaction request message to include the tokenization flag, wherein the tokenization flag is a first tokenization flag; and providing the interaction request message to a processing network computer;

the system further comprising:

a tokenization computer comprising:

a tokenization processor; and a tokenization computer-readable medium coupled to the tokenization processor, the tokenization computer-readable medium comprising tokenization code executable by the tokenization processor to perform operations comprising:

receiving, from the processing network computer, a tokenization request message, wherein the tokenization request message comprises the first user account data, the second user account data and the tokenization flag, wherein the first user account data is a first real account number associated with the first user of the first user device and the second user account data is a second real account number associated with the second user of the second user device;

selecting a tokenization option of a plurality of tokenization options in a tokenization matrix based on the first user account data and the second user account data, wherein the tokenization option includes the first user account data, the second user account data, the first tokenization flag, and a second tokenization flag, wherein the first tokenization flag is set by the first authorizing entity computer and the second tokenization flag is a second value set by a second authorizing entity computer that maintains a second user account on behalf of the second user of the second user device;

determining alternate first user account data and alternate second user account data based on the tokenization option, and generating a tokenization response message comprising the alternate first user account data and the alternate second user account data; and providing the tokenization response message to the processing network computer.

15. The system of claim 14, the authorizing entity processor further:

transferring the amount from an account of the first user to an account of the second user based on determining to authorize the interaction.

16. The system of claim 14, wherein the interaction request message comprises an amount of funds, wherein the processing network computer receives the tokenization response message, modifies the tokenization response message with the alternate first user account data and the alternate second user account data, and provides the tokenization response message to a second authorizing entity computer, the authorizing entity processor further:

providing the amount of funds indicated in the interaction request message to the second authorizing entity computer via the processing network computer using the alternate second user account data.

17. The system of claim 14, wherein the second user account data is selected from a list of account data by the first user on the first user device, wherein the first user account data is a real account number, and wherein the first tokenization flag indicates not to tokenize the real account number, wherein the interaction between the first user device and the second user device is a data transfer between the first user device and the second user device, wherein the amount is an amount of data to be transferred, and wherein determining to authorize the interaction further comprises the authorizing entity processor further performing:

determining to authorize the data transfer based on content of the data to be transferred, the amount, a data transfer history of the first user device and/or a data limit of the first user device.

18. The system of claim 14, the authorizing entity processor further:

providing a notification of the interaction to the first user device of the first user;

receiving, from the first user device, a notification response that indicates whether or not the first user accepted the interaction; and updating a user account if the first user accepts the interaction.

19. The system of claim 14, wherein:

determining the alternate first user account data comprises determining that the first authorizing entity computer associated with the first user device is not enrolled in a tokenization program with the tokenization computer and determining that the first user account data is not to be tokenized, and determining the alternate second user account data comprises determining that the second authorizing entity computer associated with the second user device is enrolled in the tokenization program with the tokenization computer and determining that the second user account data is to be tokenized, and wherein the alternate second user account data is a token.

* * * * *